(12) United States Patent
Nguyen et al.

(10) Patent No.: US 10,267,940 B2
(45) Date of Patent: Apr. 23, 2019

(54) NOISE TEMPLATE ADAPTATION

(71) Applicant: PGS Geophysical AS, Oslo (NO)

(72) Inventors: Truong Nguyen, Weybridge (GB); Richard Dyer, Weybridge (GB)

(73) Assignee: PGS Geophysical AS, Oslo (NO)

( * ) Notice: Subject to any disclaimer, the term of this patent is extended or adjusted under 35 U.S.C. 154(b) by 124 days.

(21) Appl. No.: 15/281,858

(22) Filed: Sep. 30, 2016

(65) Prior Publication Data

US 2017/0097433 A1   Apr. 6, 2017

Related U.S. Application Data

(60) Provisional application No. 62/237,269, filed on Oct. 5, 2015.

(51) Int. Cl.
*G01V 1/38* (2006.01)
*G01V 1/36* (2006.01)

(52) U.S. Cl.
CPC .......... *G01V 1/3808* (2013.01); *G01V 1/364* (2013.01); *G01V 1/38* (2013.01); *G01V 2210/324* (2013.01); *G01V 2210/34* (2013.01); *G01V 2210/48* (2013.01)

(58) Field of Classification Search
None
See application file for complete search history.

(56) References Cited

U.S. PATENT DOCUMENTS

| | | | |
|---|---|---|---|
| 7,646,924 B2 | 1/2010 | Donoho | |
| 7,840,625 B2 | 11/2010 | Candes et al. | |
| 7,881,501 B2 | 2/2011 | Pinnegar et al. | |
| 8,213,260 B2 | 7/2012 | Nichols | |
| 8,279,707 B2 | 10/2012 | Hennenfent | |
| 8,280,695 B2 * | 10/2012 | Neelamani | G01V 1/36 367/73 |
| 8,352,190 B2 | 1/2013 | Baumstein et al. | |
| 8,538,702 B2 | 9/2013 | Neelamani et al. | |
| 8,588,028 B2 | 11/2013 | Nichols et al. | |
| 9,075,162 B2 | 7/2015 | Baardman et al. | |

(Continued)

OTHER PUBLICATIONS

Emmanuel Candes, et al., "Fast Discrete Curvelet Transforms," Applied and Computational Mathematics, Caltech, Pasadena, CA; Department of Statistics, Stanford University, Stanford, CA, Jul. 2005, revised Mar. 2006, 44 pages.

(Continued)

*Primary Examiner* — Manuel A Rivera Vargas

(57) ABSTRACT

Techniques are disclosed relating to reducing noise in geophysical marine survey data. According to some embodiments, a complex-valued, directional, multi-resolution (CDM) transform may be applied to marine survey input data and a noise template. Global adaptation constraints and, optionally, local adaptation constraints may be generated dependent on the transformed marine survey data and transformed noise template. The transformed noise template may be adapted dependent upon the global (and, optionally, local) constraints, and the adapted transformed noise template may be subtracted from the transformed marine survey data to remove noise. An inverse CDM transform may be performed on the resulting data to generate reduce-noise marine survey data in the input domain.

22 Claims, 9 Drawing Sheets

(56) References Cited

U.S. PATENT DOCUMENTS

| | | |
|---|---|---|
| 9,146,329 B2 | 9/2015 | Houck et al. |
| 9,151,856 B2 | 10/2015 | Beasley et al. |
| 2010/0211320 A1 | 8/2010 | Vassallo et al. |
| 2011/0213556 A1 | 9/2011 | Yu et al. |
| 2012/0275267 A1 | 11/2012 | Neelamani et al. |
| 2013/0003500 A1 | 1/2013 | Neelamani et al. |
| 2013/0100771 A1 | 4/2013 | Diallo et al. |
| 2013/0182533 A1 | 7/2013 | Rentsch-Smith |
| 2013/0253838 A1 | 9/2013 | Tegtmeier-Last et al. |
| 2014/0019055 A1 | 1/2014 | Kustowski et al. |
| 2014/0043936 A1 | 2/2014 | Poole |
| 2014/0188395 A1 | 7/2014 | Poole et al. |
| 2014/0200818 A1 | 7/2014 | Peng et al. |
| 2014/0200819 A1 | 7/2014 | Wu |
| 2014/0269185 A1 | 9/2014 | Ferber et al. |
| 2014/0269186 A1 | 9/2014 | Tegtmeier-Last et al. |
| 2014/0278118 A1 | 9/2014 | Tegtmeier-Last et al. |
| 2014/0365135 A1 | 12/2014 | Poole |
| 2015/0023608 A1 | 1/2015 | Donoho |
| 2015/0117151 A1 | 4/2015 | Curry et al. |
| 2015/0120199 A1 | 4/2015 | Casey |
| 2015/0212222 A1 | 7/2015 | Poole |
| 2015/0236668 A1 | 8/2015 | Poole et al. |

OTHER PUBLICATIONS

Felix J. Herrmann, et al. "Curvelet-domain multiple elimination with sparseness constraints," SEG Int'l Exposition and 74th Annual Meeting, Denver, CO, Oct. 10-15, 2004, 4 pages.

Michael Jervis, et al., "Edge preserving filtering on 3-D seismic data using complex wavelet transforms," SEG/New Orleans 2006 Annual Meeting, 5 pages.

Ramesh (Neelsh) Neelamani, et al., "Adaptive subtraction using complex-valued curvelet transforms," Geophysics, vol. 75, No. 4, Jul.-Aug. 2010, p. V51-V60, 13 Figs, 10 pages.

Sergi Ventosa, et al., "Unary adaptive subtraction of joint multiple models with complex wavelet frames," SEG Las Vegas 2012 Annual Meeting, 5 pages.

Sergi Ventosa, et al., "Adaptive multiple subtraction with wavelet-based complex unary Wiener filters," Geophysics, vol. 77, No. 6 (Nov.-Dec. 2012); p. V183-V192, 10 Figs, 10 pages.

Margaret Yu, et al., "Flexible surface multiple attenuation using the curvelet transform," SEG San Antonio 2011 Annual Meeting, 5 pages.

\* cited by examiner

NOISE TEMPLATE ADAPTATION

CROSS-REFERENCE TO RELATED APPLICATIONS

This application claims priority to U.S. Provisional Patent Application No. 62/237,269, filed on Oct. 5, 2015, which is hereby incorporated by reference in its entirety.

BACKGROUND

Geophysical surveys are often used for oil and gas exploration in geophysical formations, which may be located below marine environments. Various types of signal sources and geophysical sensors may be used in different types of geophysical surveys. Seismic geophysical surveys, for example, are based on the use of seismic waves. Electromagnetic geophysical surveys, as another example, are based on the use of electromagnetic waves. In some surveys, a survey vessel may tow one or more sources (e.g., air guns, marine vibrators, electromagnetic sources, etc.) and one or more streamers along which a number of sensors (e.g., hydrophones and/or geophones and/or electromagnetic sensors) are located.

During the course of a geophysical survey, the various sensors may collect data indicative of geological structures, which may be analyzed, e.g., to determine the possible locations of hydrocarbon deposits. However, the data may be contaminated by various sources of noise that may complicate the data analysis. In some cases, the expected noise may be modeled and applied to the data as part of a noise-reduction process. Because the noise model may be imperfect, it may be adapted before being applied to the data, e.g., to better fit the general noise model to the particular circumstances in which the survey occurred.

Various challenges may arise in choosing how to adapt a noise model in order to achieve an effective level of noise reduction. Embodiments of this disclosure may be used to address some of these challenges, as discussed below.

DETAILED DESCRIPTION

Figure 1:
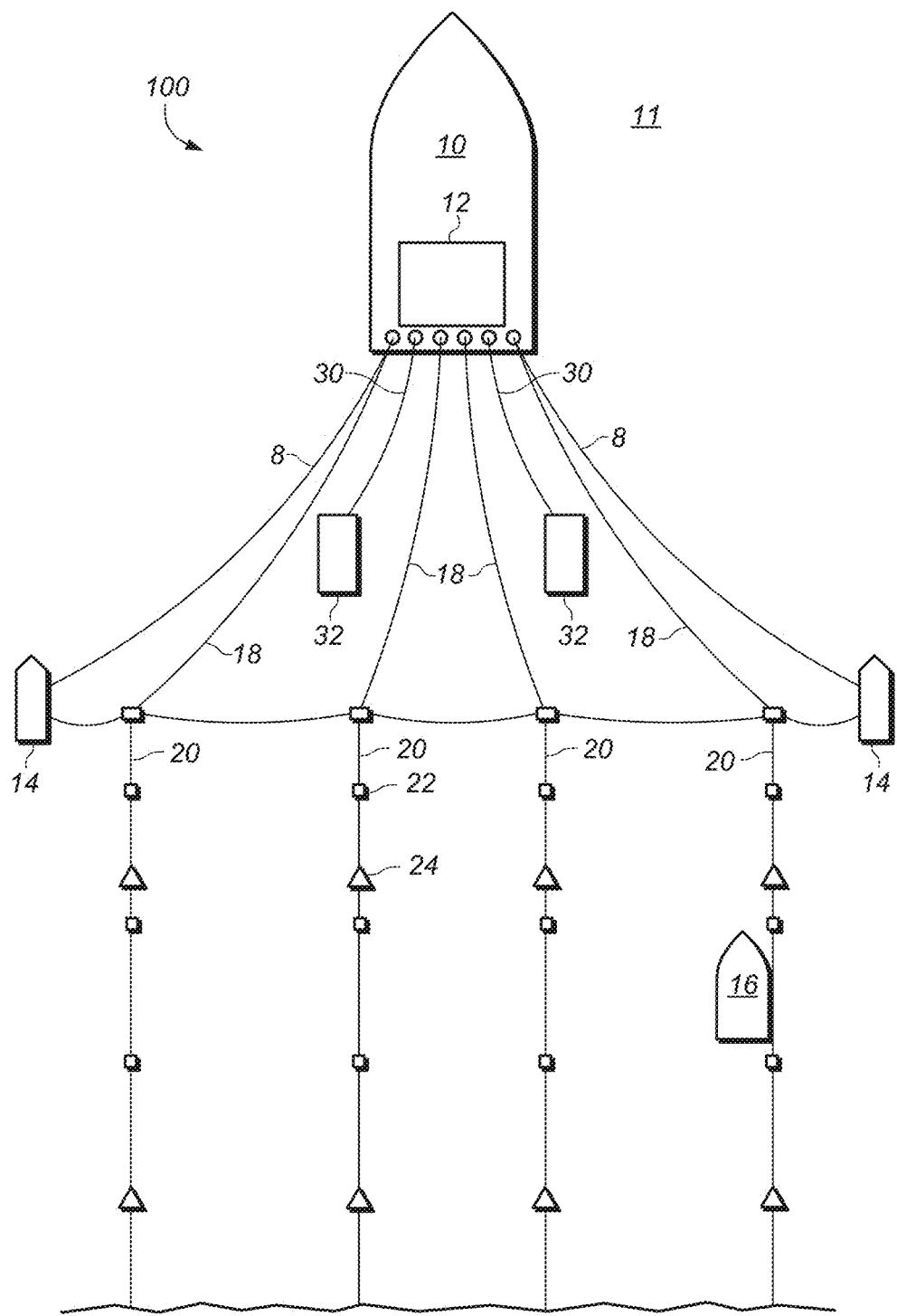
FIG. 1 shows an embodiment of a marine geophysical survey.
Figure 2A:
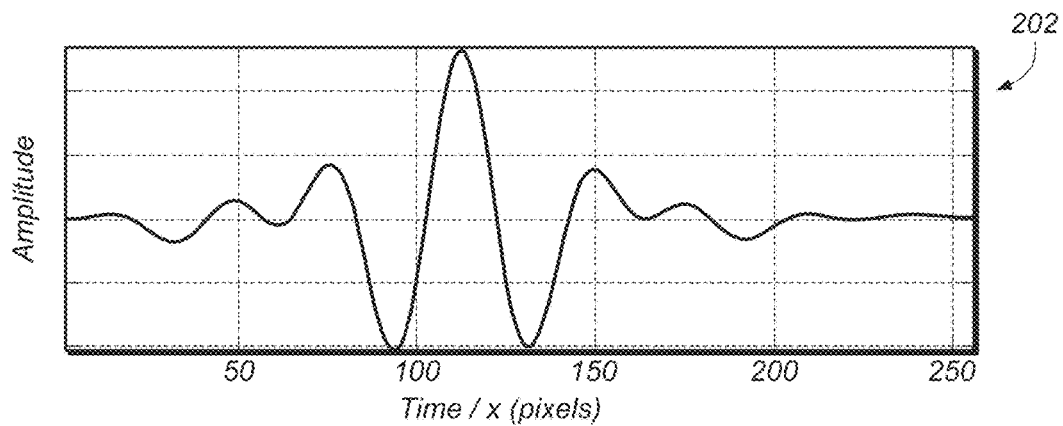
FIGS. 2A-B show embodiments of real and imaginary components of a complex curvelet basis function.
Figure 2B:
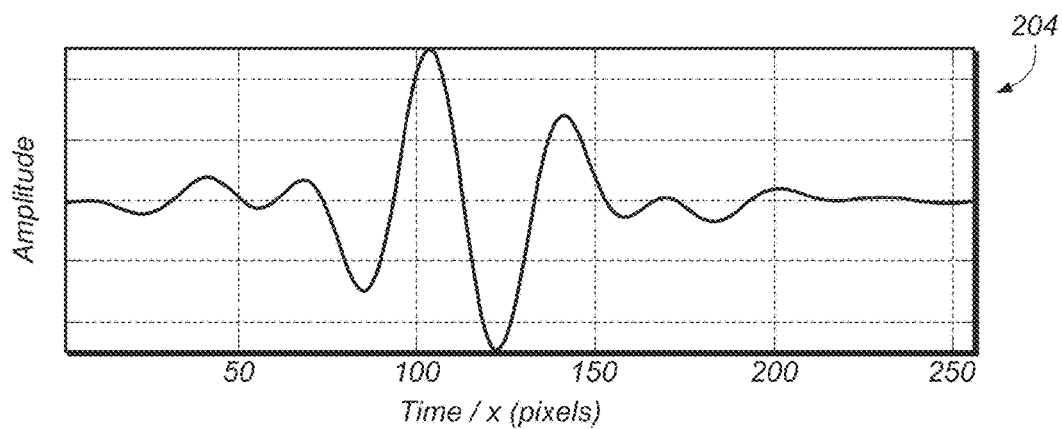

This disclosure initially describes, with reference to FIG. 1, an overview of a geophysical survey system. It then describes example transform and noise removal techniques with reference to FIGS. 2-9. Finally, an example computing system is described with reference to FIG. 10.

Survey Overview

Referring to FIG. 1, an illustration of one embodiment of a geophysical survey system 100 is shown (not necessarily to scale). System 100 includes survey vessel 10 (also referred to as a "first vessel"), signal sources 32, source cables 30, paravanes 14, and streamers 20. (Streamers 20 are shown truncated at the bottom of FIG. 1.) Survey vessel 10 may be configured to move along a surface of body of water 11 such as a lake or ocean. In the illustrated embodiment, survey vessel 10 tows streamers 20, signal sources 32, and paravanes 14, which may be used to provide a desired amount of spread among streamers 20. In other embodiments, streamers 20 may be towed by a separate vessel (not shown), rather than survey vessel 10 that tows signal sources 32.

Streamers 20 may include sensors 22 (e.g., hydrophones, geophones, electromagnetic sensors, etc.). Streamers 20 may further include streamer steering devices 24 (also referred to as "birds") which may provide selected lateral and/or vertical forces to streamers 20 as they are towed through the water, typically based on wings or hydrofoils that provide hydrodynamic lift. Streamers 20 may further include tail buoys (not shown) at their respective back ends. System 100 further includes chase vessel 16 (also referred to as a "second vessel"), which may be used to maintain (e.g., clean, service, or repair) selected elements of system 100 (e.g., streamers 20) as needed. For example, sections of a streamer 20 may be replaced, or auxiliary equipment may be replaced. For example, chase vessel 16 may include devices (discussed in more detail below) to allow streamers 20 to be lifted out of the water as desired.

Survey vessel 10 may include equipment, shown generally at 12 and for convenience collectively referred to as a "recording system." Recording system 12 may include devices such as a data recording unit (not shown separately) for making a record with respect to time of signals generated by various geophysical sensors. Recording system 12 may also include navigation equipment (not shown separately), which may be configured to control, determine, and record, at selected times, the geodetic positions of: survey vessel 10, signal sources 32, streamers 20, sensors 22, etc. As illustrated in FIG. 1, streamers 20 are coupled to survey vessel 10 via cables 18.

Collectively, the survey data that is recorded by recording system 12 may be referred to as "marine survey input data." In embodiments where the survey being performed is a seismic survey, the recorded data may be more specifically referred to as "marine survey seismic data," although the marine survey input data may encompass survey data generated by other techniques. In various embodiments, the marine survey input data may not necessarily include every observation captured by sensors 22 (e.g., the raw sensor data may be filtered before it is recorded). Also, in some embodiments, the marine survey input data may include data that is not necessarily indicative of subsurface geology, but may nevertheless be relevant to the circumstances in which the survey was conducted (e.g., environmental data such as water temperature, water current direction and/or speed, salinity, etc.).

Geodetic position (or "position") of the various elements of system 100 may be determined using various devices, including navigation equipment such as relative acoustic ranging units and/or global navigation satellite systems (e.g., a global positioning system (GPS)).

Each of signal sources 32 may include sub-arrays of multiple individual signal sources. For example, a signal source 32 may include a plurality of air guns, marine vibrators, or electromagnetic signal sources. In various embodiments, a geophysical survey system may include any appropriate number of towed signal sources 32 and streamers 20.

In some embodiments, various items of information relating to geophysical surveying (e.g., raw data collected by sensors and/or marine survey input data generally, or products derived therefrom by the use of post-collection processing, to the extent these differ in various embodiments), may be stored within a computer-readable, non-transitory medium to form a "geophysical data product." A geophysical data product may embody geophysical data (such as raw streamer data, processed streamer data, two- or three-dimensional maps based on streamer data, etc.). Some non-limiting examples of computer-readable media may include tape reels, hard drives, CDs, DVDs, flash memory, printouts, etc., although any tangible medium may be employed to create the geophysical data product. In some embodiments, raw analog data from streamers may be stored as a geophysical data product. In other instances, as noted above, the data may first be digitized and/or conditioned prior to being stored as the geophysical data product. In yet other instances, the data may be fully processed into a two- or three-dimensional map of the various geophysical structures before being stored as the geophysical data product. The geophysical data product may be produced offshore (e.g., by equipment on a vessel) or onshore (e.g., at a facility on land).

Noise Processing in Marine Survey Data and Overview of Complex Transforms

As noted above, when collecting marine survey input data of any type, the resultant data may include not only useful information indicative of, e.g., subsurface geology, but also noise that may interfere with useful information. One approach for dealing with such noise involves application of a model or template representative of expected noise to the marine survey input data. For example, prior survey experience in a particular area may lead to an understanding of typical noise phenomena that may tend to occur in that area. These phenomena may then be modeled by a noise template that can be applied to marine survey input data to subtract the modeled noise, ideally improving the signal-to-noise ratio of the resultant data.

Regardless of how the noise template is initially generated, it may be possible to further improve its effectiveness by adapting the noise template to more accurately resemble the actual noise present in a given set of marine survey input data. For example, even if a noise phenomenon is understood and modeled in a general way, there may be numerous variations of how that phenomenon might interact with data collected in a particular survey, owing to variability in the exact geometry with which the survey is conducted (e.g., the number of sources and sensors employed, their relative orientation, the orientation of the survey system within the survey environment, etc.), variability in environmental conditions, and/or other possible factors. Specifically adapting a generalized noise template to particular marine survey input data may at least partially account for such variability, thus better fitting the noise template to the actual noise that is encountered.

One approach for adapting a noise template involves a process of least-squares filtering, in which one or more convolutional filters are designed in the time-space (t-x) domain. Such convolutional filter(s) may be employed to adapt the noise template so that the residual energy after subtracting the adapted template from the input data is minimized.

By contrast, the following discussion describes techniques in which marine survey input data as well as a noise template are transformed from the input (e.g., t-x) domain into a transform domain, where adaptation of the noise template occurs in the transform domain. Generally speaking, the process of transforming data from an input domain to a transform domain can be understood as a process of mapping or projecting the input-domain representation of the data onto a set of transform-domain basis functions to generate a set of coefficients of those basis functions that are representative of the transformed data. The sum of the basis functions weighted by their respective coefficients may constitute the transform-domain representation of the original data. In some cases, mathematical equivalence of the transform-domain representation to the original-domain representation may require an infinite number of coefficients, although for practical purposes, the number of coefficients employed may depend on the degree of precision or resolution required by a particular application.

For example, the well-known Fourier transform can be used to transform a time-domain signal into the frequency domain, where the Fourier basis functions are sine and/or cosine signals at various frequencies, and where the transform involves generating a set of Fourier coefficients respectively corresponding to the basis functions. The resulting linear sum of the Fourier basis functions weighted by the Fourier coefficients constitutes a frequency-domain representation of the original time-domain signal.

In the following discussion, the types of transforms that may be employed may generally be referred to as complex-valued, directional, multi-resolution (CDM) transforms. Like transforms generally, the transformation of input domain data to a CDM transform domain involves the generation of a set of coefficients corresponding to a set of CDM transform basis functions in order to generate a weighted sum of coefficients and basis functions. Generally speaking, a CDM transform is "complex-valued" in the sense that the CDM transform basis functions are defined in the complex number plane, and may include both real and imaginary parts. CDM transform coefficients may also be complex numbers. A CDM transform is "directional" in the sense that the properties of the CDM transform basis functions are anisotropic (i.e., directionally dependent). For example, for CDM transform basis functions defined on a 2-dimensional plane, the behavior of the basis function along one dimension may differ from the behavior of the basis function along an orthogonal dimension. (It is noted that CDM transform basis functions may be defined in 3-dimensional or higher-order spaces.) Finally, a CDM transform is "multi-resolution" in the sense that the CDM transform basis functions may occupy different frequency bands, where different frequencies are capable of representing data at different resolutions.

CDM transforms may include a variety of more specific types of transforms, including complex curvelet transforms, complex wavelet transforms, and complex contourlet transforms. Although the following discussion focuses principally on the complex curvelet transform, it is noted that the techniques described below may apply equally to complex wavelets, contourlets, or other types of CDM transforms. Moreover, while the techniques are described below principally with respect to discrete CDM transforms, they may also be applicable to continuous CDM transforms.

Generally speaking, the complex curvelet transform of data from an input domain is represented as a weighted sum of complex curvelet basis functions, where the weights (i.e., coefficients) are also complex-valued. In some implementations, the complex curvelet basis function may be represented as a combination of two real-valued curvelet basis functions, the first representing the real part of the complex basis function, and the second representing the imaginary part. The real and imaginary parts of the complex curvelet basis function may exhibit a constant phase-shift relationship. For example, in the embodiment shown in FIG. 2, real 202 and imaginary 204 parts of a cross-section of a complex curvelet basis function are shown to resemble windowed sinusoids having a 90-degree phase offset.

Figure 3:
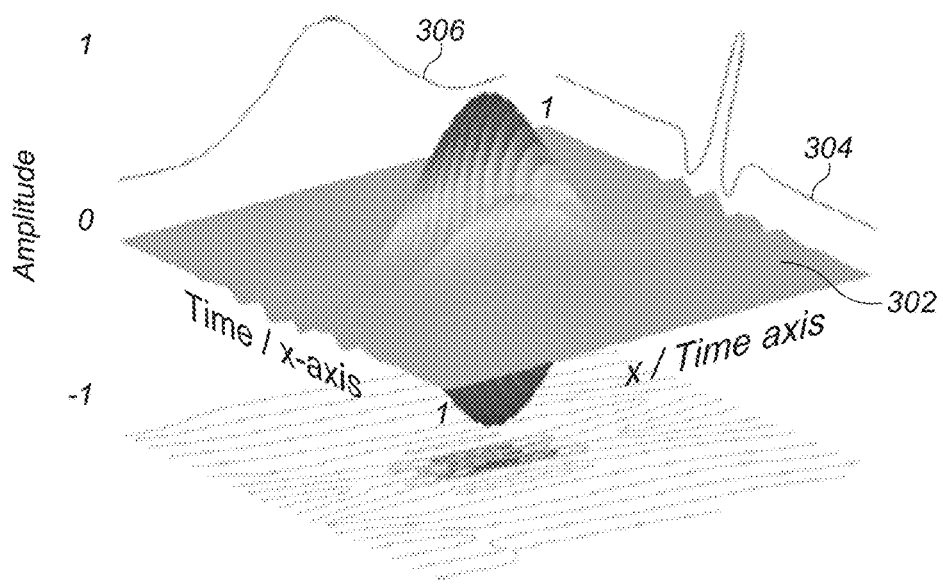
FIG. 3 illustrates anisotropy exhibited by an embodiment of a curvelet basis function.

FIG. 3 illustrates the anisotropy exhibited by one example of a curvelet basis function. In FIG. 3, a real-valued 2-dimensional curvelet basis function 302 is shown. (As noted above, a complex curvelet basis function may employ a combination of such real-valued curvelets.) When projected across one dimension, cross-section 304 of the curvelet basis function resembles a windowed sinusoid that quickly decays towards zero. When projected across the orthogonal dimension, cross-section 306 of the curvelet basis function has a Gaussian profile. When combined, these give rise to a series of undulating ridges having a pronounced orientation and approximately finite extent. (It is noted that FIG. 3 is merely one example intended to facilitate understanding, and that many variations are possible and contemplated.)

Figure 4:
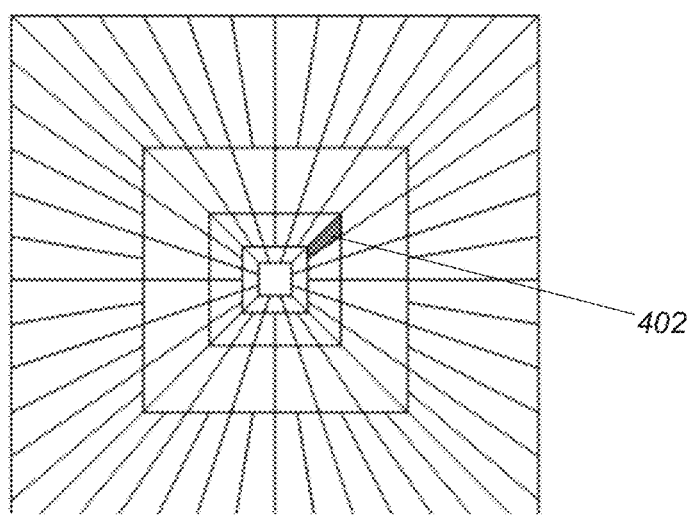
FIG. 4 illustrates an example of how a curvelet transform relates to a frequency-wavenumber (f-k) representation of data.

FIG. 4 graphically illustrates one example of how a curvelet transform relates to a frequency-wavenumber (f-k) representation of data. In the illustrated example, the curvelet transform first divides the f-k domain into a number of concentric square annuli, which may also be referred to as scales. Four annuli (not counting the centermost square around which the annuli are centered) are shown in the embodiment of FIG. 4, although any suitable number may be employed. Each annulus or scale may then be divided into a number of angled wedges, a selected one of which is shaded in FIG. 4 and denoted 402. Each wedge may have its own respective set of curvelet coefficients, and this collection of coefficients may be referred to as a "subband."

Noise Reduction With Global Adaptation

As noted above, noise reduction in marine survey input data may be improved if an existing noise template is adapted to more closely fit the marine survey input data before it is applied to that data. However, different noise phenomena may behave differently, and adaptation techniques suited to one phenomenon may be less suited to others. For example, variations or perturbations in the noise model relative to the marine survey input data may occur on a relatively small scale in space or time. Such variations may be referred to as "local variation," and in some instances, they may reflect conditions that are localized within the survey (such as, e.g., the presence of a discrepancy that affects survey observations within a certain vicinity of some point in space or time, but not observations that are more remote from that point).

Other types of variation in the noise model relative to the marine survey input data may occur on a large scale in space or time, and may be referred to as "global variation." Global variation may reflect systematic mismatches between the noise template and the marine survey input data (such as, e.g., a mismatch between the two in space or time, or another type of pervasive discrepancy that affects many or possibly all points within the survey).

Figure 5:
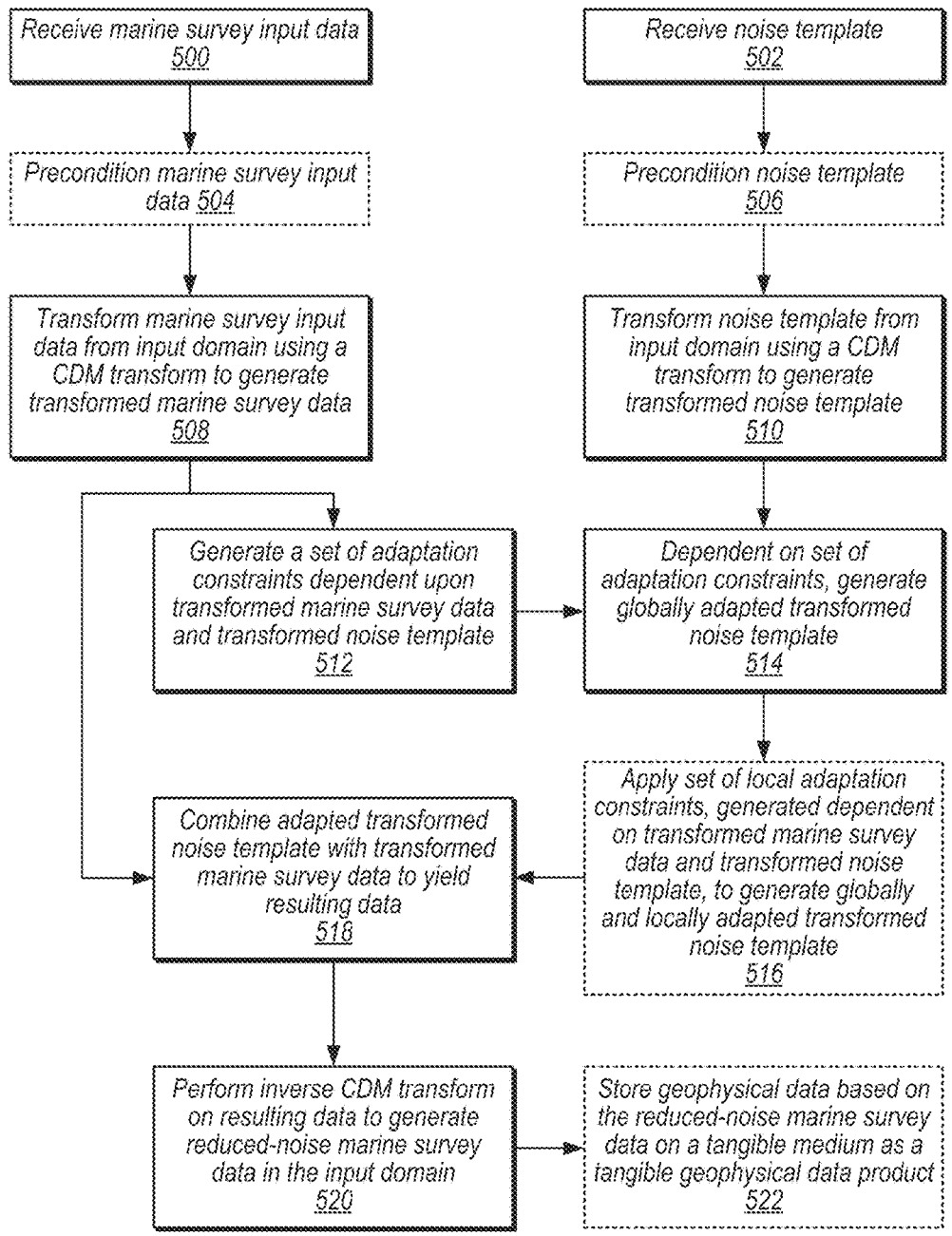
FIG. 5 shows a data flow diagram that illustrates an embodiment of a method for performing global and (optionally) local adaptation on a noise template in a complex-valued, directional, multi-resolution (CDM) transform domain.

Techniques for reducing local variation in the noise template may not be as effective in reducing global variation, or vice versa. The data flow diagram of FIG. 5 illustrates an embodiment of a technique for performing global and (optionally) local adaptation on a noise template in a CDM transform domain. In some circumstances, the combination of global and local adaptation may be more effective than local adaptation performed alone. In some embodiments, however, local adaptation may be omitted and only global adaptation may be performed.

Operation begins at blocks 500-502 where marine survey input data and a noise template are received. (As a preliminary matter, because the marine survey input data and noise template follow separate processing paths, FIG. 5 is primarily organized to reflect the data flow of these separate paths. However, although processing may occur in parallel to the extent data flow permits, the illustrated operations on the various paths are not necessarily performed synchronously. Moreover, in some embodiments, processing may occur sequentially rather than in parallel.) As noted above, the marine survey input data may include geophysical data indicative of geological structure, and may include noise. The noise template may be indicative of predicted noise in the marine survey input data.

Prior to further processing, either the marine survey input data, the noise template, or both may be optionally preconditioned (block 504-506). Such preconditioning may be employed to correct for errors that can be precisely defined in the input domain (e.g., the t-x domain). For example, the marine survey input data might be misaligned with respect to the noise template in space or time by a constant amount across the entire data set; in this case, preconditioning may involve uniformly correcting for such misalignment. It is noted that the preconditioning operation may be omitted; in some embodiments, the types of errors addressed by preconditioning may be adequately processed in the global adaptation stage discussed below.

The marine survey input data may then be transformed from an input domain using a CDM transform to generate transformed marine survey data (block 508). For example, the CDM transform may include the complex curvelet transform discussed above, which may be applied to t-x domain survey data to generate curvelet domain data. However, in other embodiments, a wavelet transform, contourlet transform, or other type of CDM transform may be employed. In a similar manner, the noise template may be transformed using the CDM transform to generate a transformed noise template (block 510).

Dependent upon the transformed marine survey data and the transformed noise template, a set of adaptation constraints is generated (block 512). As discussed in greater detail below with respect to FIG. 6, in some embodiments, the adaptation constraints may be generated by performing statistical parameter estimation with respect to the transformed marine survey data and the transformed noise template. Moreover, in some embodiments, the adaptation constraints may include global adaptation constraints and local adaptation constraints, although in other embodiments in which local adaptation is omitted, only global adaptation constraints may be generated.

Dependent on the set of adaptation constraints, a globally adapted transformed noise template is generated (block 514). Generation of the adapted transformed noise template at this stage may reduce one or more instances of global variation in the transformed noise template. As discussed in greater detail below with respect to FIG. 7, in some embodiments, generation of the globally adapted transformed noise template (which may also be referred to as "global adaptation") may be performed by applying a set of complex unary filters, resulting from generation of the global adaptation constraints, to the transformed noise template. As described below, the set of complex unary filters may include a member for each subband of the transformed noise template, and the member may be generated dependent upon first order statistics (e.g., a mean amplitude ratio and a mean phase difference) for the corresponding subband based on the statistical parameter estimation process described with respect to FIG. 6.

A set of local adaptation constraints, generated dependent upon the transformed marine survey data and the transformed noise template, may be applied to the globally adapted transformed noise template to generate a globally and locally adapted transformed noise template (block 516). Generation of the globally and locally adapted transformed noise template at this stage may reduce one or more instances of local variation in the transformed noise template. As discussed in greater detail below with respect to FIG. 8, generation of the globally and locally adapted noise template (which may also be referred to as "local adaptation") may be performed by further modifying curvelet coefficients of the noise template using the results of the statistical parameter estimation mentioned above. As noted previously, in some embodiments, the local adaptation step may be omitted.

The adapted transformed noise template (i.e., either globally and locally adapted, or only globally adapted) is then combined with the transformed marine survey data to yield resulting data (block 518). The process of combining the adapted transformed noise template with the transformed marine survey data may operate to remove noise from the transformed marine survey data. In some embodiments, the combining process may be referred to as subtraction, and in fact some implementations may implement the combining process as simple pointwise subtraction. However, the combining process may also be considerably more sophisticated than simple pointwise subtraction, because even following the adaptation process, some mismatches (e.g., in amplitude, phase, or other factors) may remain between the data and the adapted noise template. Accordingly, in some embodiments, "subtraction" may refer to a process of adaptive subtraction, in which an attempt is made to minimize an energy difference (e.g., in a least-squares sense, or according to another suitable criterion) between the transform-domain representation of the marine survey data and the adapted noise template.

An inverse CDM transform is then performed on the resulting data to generate reduced-noise marine survey data in the input domain (block 520). For example, in embodiments where the CDM transform is a complex curvelet transform, an inverse curvelet transform may be applied to yield reduced-noise or "de-noised" marine survey data in the original input domain (e.g., the t-x domain). (The term "de-noised" does not necessarily mean that all noise has been removed, but rather that at least some noise has been reduced.) As an optional step, geophysical data based on the reduced-noise marine survey data may be stored on a tangible medium as a tangible geophysical data product of the type described above (block 522). For example, a geophysical data product storing reduced noise marine survey data or other data derived from the reduced noise marine survey data may be generated in one location (e.g., on an offshore vessel) and later transported to another location (e.g., an onshore data processing center) for further operations (e.g., further geophysical analysis to ascertain the presence of hydrocarbons).

Figure 6:
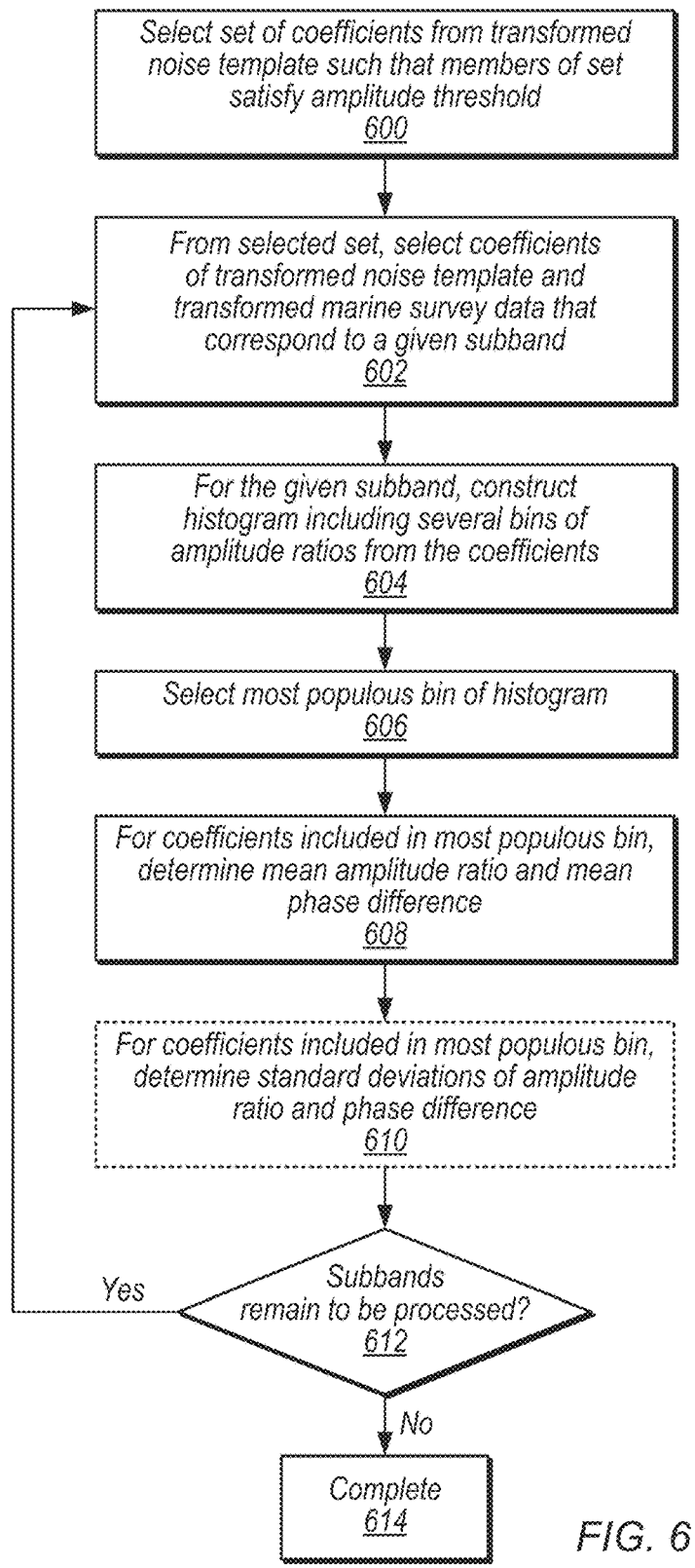
FIG. 6 shows a flow diagram that illustrates an embodiment of a method of statistical parameter estimation that may be used to generate a set of adaptation constraints for noise template adaptation.

The flow chart of FIG. 6 illustrates an embodiment of a method of statistical parameter estimation that may be employed to generate the set of adaptation constraints described above with respect to block 512 of FIG. 5. Specifically, in the illustrated embodiment, generating the set of adaptation constraints (including the global adaptation constraints and, if implemented, the local adaptation constraints mentioned above) includes performing statistical parameter estimation with respect to at least one subband of the transformed marine survey data and at least one subband of the transformed noise template.

Preliminarily, as discussed below, the illustrated technique operates on curvelet coefficients of the transformed noise template on a subband-by-subband basis. As noted with respect to FIG. 4, a subband of curvelet-domain data corresponds to a particular segment or wedge of one of the illustrated concentric square annuli. Generally speaking, the number of subbands employed for a given curvelet transform may vary depending on the particular implementation of the transform and/or on the characteristics of the data to be transformed. Increasing the number of subbands may provide greater resolution, which may improve processing of data whose frequencies occupy a broad spectrum. However, increasing the number of subbands may also present a tradeoff in the resolution in the f-k transform domain relative to the t-x input domain; as the number of subbands increases, the f-k support of each curvelet basis function may reduce, yielding finer resolution, but may correspondingly spread out in the t-x domain, yielding coarser resolution. Secondarily, increasing the number of subbands may increase the computational workload required to apply the transform, representing a possible tradeoff in resolution versus speed.

In FIG. 6, processing begins at block 600 where a set of coefficients is selected from the transformed noise template such that members of the set each satisfy an amplitude threshold. Those coefficients in the transformed marine survey data that correspond to the coefficients selected from the transformed noise template may also be retained. For example, there may be a one-to-one correspondence between curvelet coefficients in the transformed noise template and curvelet coefficients in the transformed marine survey data.

In some embodiments, the amplitude threshold may be a user-configurable parameter. For example, the amplitude threshold may be expressed as a percentile, such that only those curvelet coefficients of the noise template at or above the xth percentile would be selected. The choice of the percentile threshold x may be made by the user dependent upon an assessment of the noise template being employed with respect to the particular set of marine survey input data being processed. For example, if it is expected that the noise template will predict noise in the survey data relatively poorly, the amplitude threshold may be chosen to be higher, to bias the selection of coefficients in the noise template towards those having higher amplitudes. On the other hand, if the noise template is expected to predict noise relatively well, the amplitude threshold may be chosen to be lower, and the resultant selection of coefficients will be more inclusive.

Next, the statistical parameter estimation process selects from the output of block 600 the coefficients of the transformed noise template and the transformed marine survey data that correspond to a given subband (block 602). For the given subband of the transformed marine survey data and the corresponding subband of the transformed noise template, a histogram including several bins of amplitude ratios is constructed from the coefficients (block 604). In the illustrated embodiment, each amplitude ratio in the histogram indicates a ratio of a member $c_m$ of the set of coefficients selected from the transformed noise template according to the amplitude threshold in block 602 and a corresponding coefficient $c_d$ of the transformed marine survey data. Because the coefficients in a complex curvelet transform may themselves be complex-valued, the magnitude of the coefficient may be taken before the ratio is determined: $|c_d|/|c_m|$.

Construction of the histogram may be performed manually by the user or automatically. In particular, in various embodiments the bin size may be defined according to either an absolute scale or a logarithmic scale. In some embodiments, the bin size may be determined dependent upon whether a most populous bin of the histogram satisfies a population threshold. For example, the threshold requirement may be that the most populous bin should contain no more than a specified fraction (e.g., half, though any suitable parameter may be chosen) of the total number of points in the histogram. If the threshold requirement is not met with an initial bin size because the most populous bin contains too many points, the bin size may be reduced and the histogram regenerated. This process may occur iteratively until the threshold requirement is satisfied. (It is also possible to proceed in the opposite direction, starting with an arbitrarily small bin size and iteratively increasing it until the threshold requirement is satisfied.)

Following generation of the histogram, the most populous bin of the histogram is selected (block 606). For the coefficients included in the most populous bin, a mean amplitude ratio and a mean phase difference are determined (block 608). Generation of the mean amplitude ratio and phase difference may also be referred to as generation of first order statistics. The mean amplitude ratio and the mean phase difference may be denoted as $\Gamma_i$ and $\Phi_i$ respectively, where i denotes the particular subband to which these statistics correspond. Collectively, the first order statistics that are determined across the set of subbands may correspond to the set of global adaptation constraints discussed above with respect to FIG. 5. It is noted that any suitable numerical or other techniques for determining the most populous bin of the histogram and for generating the first order statistics may be employed.

In embodiments where local adaptation is employed, a standard deviation of amplitude ratio and a standard deviation of phase difference are determined (block 610). Generation of these standard deviations may also be referred to as generation of second order statistics. The standard deviation of amplitude ratio and the standard deviation of phase difference may be denoted as $\gamma_i$ and $\varphi_i$ respectively, where i again denotes the particular subband to which these statistics correspond. Collectively, the second order statistics that are determined across the set of subbands may correspond to the set of local adaptation constraints discussed above with respect to FIG. 5.

If any subbands remain to be processed (block 612), operation proceeds again from block 602 where a different subband and its coefficients are selected for statistical parameter estimation processing. Otherwise, statistical parameter estimation is complete (block 614). It is noted that although FIG. 6 has been described as iterating over subbands to facilitate explanation, the operations of FIG. 6 may proceed with respect to multiple subbands concurrently.

It is noted that in some circumstances, the coefficients of the subbands may be too sparse to permit construction of a useful histogram. Accordingly, in some embodiments, subbands may be grouped together into subsets before the statistical parameter estimation process occurs. For example, such grouping may be performed adaptively depending on the results of initially attempting to perform statistical parameter estimation on individual subbands. In embodiments where subbands are grouped into subsets, the subsequent statistical parameter estimation, global adaptation, and local adaptation processes would take place with respect to subsets rather than subbands. That is, the term "subset" may be appropriately substituted for "subband" in the discussions of FIGS. 6-8 without loss of generality.

Moreover, although the above discussion centers on generation of a histogram as a manner of performing statistical parameter estimation, a histogram represents merely one possible approach. Other techniques for statistically sampling or analyzing the coefficients may be employed without necessarily involving the use of a histogram.

Figure 7:
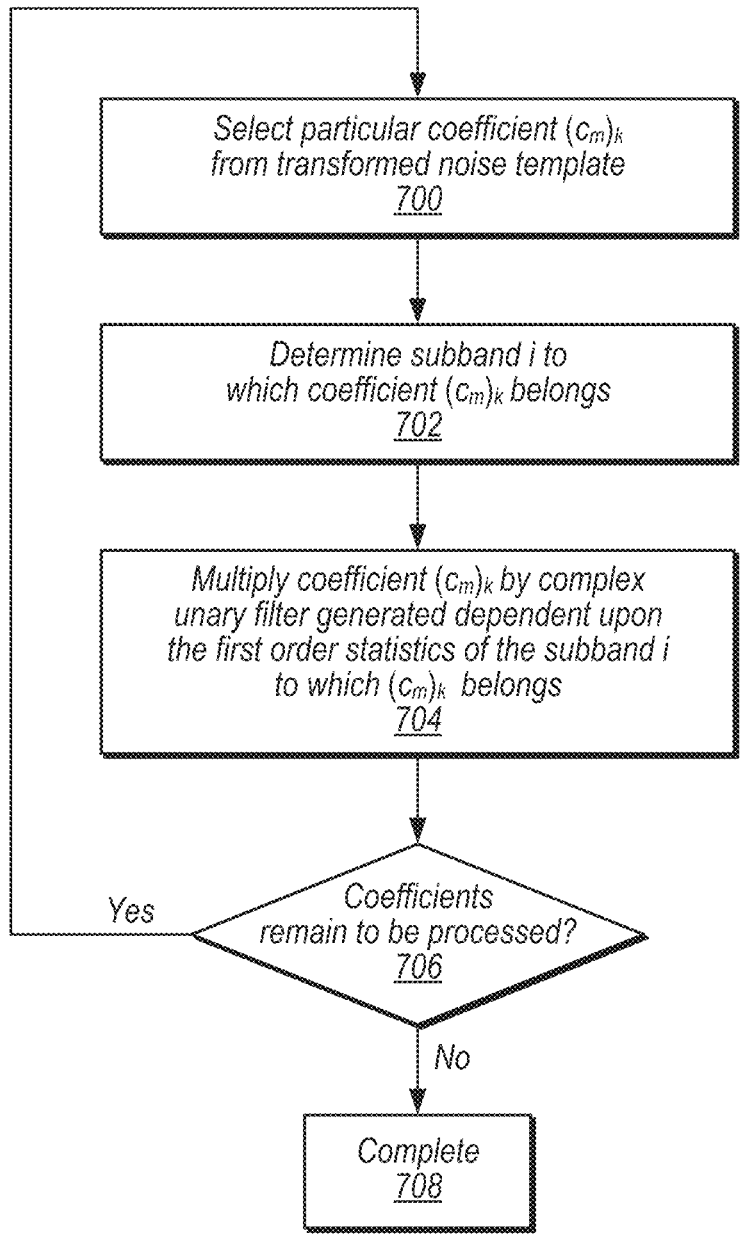
FIG. 7 shows a flow diagram that illustrates an embodiment of a method of global adaptation of a noise template.

The flow chart of FIG. 7 illustrates an embodiment of a process of global adaptation of a noise template, representing an example of a process that may be implemented by block 514 of FIG. 5 to generate the globally adapted transformed noise template discussed above.

The processing of FIG. 7 begins at block 700 where a particular coefficient of the transformed noise template, denoted $(c_m)_k$ is selected. At block 702, the subband i to which selected coefficient $(c_m)_k$ belongs is determined. (In some implementations, the curvelet transform may output coefficients grouped by subband, so determining the subband for a particular coefficient may be computationally trivial.)

Selected coefficient $(c_m)_k$ is then multiplied by a complex unary filter generated dependent upon the first order statistics of the subband to which selected coefficient $(c_m)_k$ belongs (block 704). The complex unary filter may have the form $f_i = \Gamma_i e^{j\Phi_i}$, where $\Gamma_i$ and $\Phi_i$ respectively denote the mean amplitude ratio and the mean phase difference for subband i as discussed above. The complex unary filter $f_i$ may be constructed as part of the statistical parameter estimation process of FIG. 6, or may instead be generated at the time global adaptation is performed from the first order statistics output from the statistical parameter estimation process. It is noted that in some embodiments, some or all of the first-order statistics may be selectively overridden by one or more constant user-defined values. That is, in some cases, the first-order statistics may be partially or entirely ignored after being generated (e.g., if deemed to be aberrant or unreliable), or generation of the first-order statistics may be selectively suppressed in whole or part, at the user's option.

If any remaining coefficients of the transformed noise template remain to be processed (block 706), operation proceeds from block 700 where another coefficient is selected. Otherwise, global adaptation of the transformed noise template is complete (block 708). It is noted that although the global adaptation process is shown as an iterative process to facilitate explanation, it may be implemented with any suitable degree of concurrency.

Figure 8:
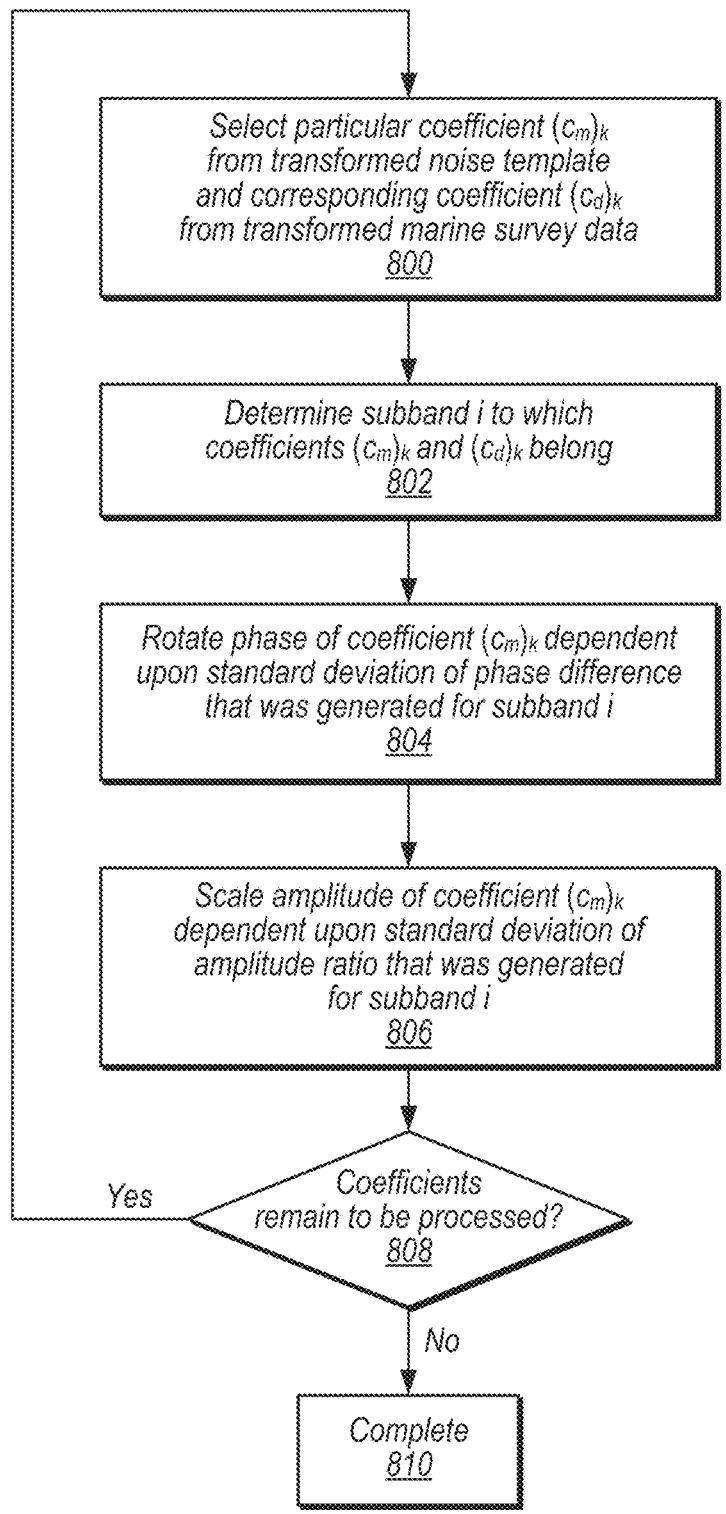
FIG. 8 shows a flow diagram that illustrates an embodiment of a method of local adaptation of a noise template.

The flow chart of FIG. 8 illustrates an embodiment of a process of local adaptation of a noise template, representing an example of a process that may be implemented by block 516 of FIG. 5 to generate the globally and locally adapted transformed noise template discussed above.

The processing of FIG. 8 begins at block 800 where a particular coefficient of the transformed noise template, denoted $(c_m)_k$ is selected, along with its corresponding coefficient in the transformed marine survey data, denoted $(c_d)_k$. At block 802, the subband i to which the selected coefficients belong is determined. (As noted above with respect to FIG. 7, determining the subband for a particular coefficient may be computationally trivial for some implementations of the curvelet transform.)

The phase of selected coefficient $(c_m)_k$ is then rotated dependent upon the standard deviation of phase difference $\varphi_i$ that was generated for subband i as part of the statistical parameter estimation process (block 804). In some embodiments, the phase of selected coefficient $(c_m)_k$ is rotated to become as close as possible to the phase of corresponding coefficient $(c_d)_k$, subject to a bound proportional to $\varphi_i$ (i.e., subject to rotating the phase by no more than $\lambda\varphi_i$ radians, where $\lambda$ may correspond to a user-defined scalar parameter that may have a default value, such as 1). In some implementations, this may be analytically computed simply by taking the phase difference between the two coefficients and then restricting the difference by $\varphi_i$ to yield the amount by which the phase of selected coefficient $(c_m)_k$ should be adjusted.

The amplitude of selected coefficient $(c_m)_k$ is then scaled dependent upon the standard deviation of amplitude ratio $\gamma_i$ that was generated for subband i as part of the statistical parameter estimation process (block 806). In some embodiments, this may be implemented by applying a scalar value s in the range $0 \leq s \leq \gamma_i$ so as to minimize $|(c_d)_k - s^*(c_m)_k|$. In some implementations, s can be analytically computed as $s = |(c_d)_k|/|(c_m)_k| * \cos(\arg((c_d)_k) - \arg((c_m)_k))$ and then restricting s to the range defined by $\gamma_i$. In some embodiments, as with the bound on the phase adjustment described in the previous paragraph, the bound on amplitude scaling may be proportional to $\gamma_i$ rather than exactly $\gamma_i$ (e.g., the bound may be of the form $\delta\gamma_i$, where $\delta$ is also a user-defined scalar parameter that may have a default value, such as 1).

If any remaining coefficients of the transformed noise template remain to be processed (block 808), operation proceeds from block 800 where another coefficient is selected. Otherwise, local adaptation of the transformed noise template is complete (block 810). As noted with respect to FIG. 7, the adaptation process of FIG. 8 need not be strictly iterative, but rather may be applied with any suitable degree of concurrency. Moreover, as noted above with respect to FIG. 7, in some embodiments, some or all of the second-order statistics may be selectively overridden by a constant user-defined value. That is, in some cases, the second-order statistics may be partially or entirely ignored after being generated (e.g., if deemed to be aberrant or unreliable), or generation of the second-order statistics may be selectively suppressed in whole or part, at the user's option.

Figure 9:
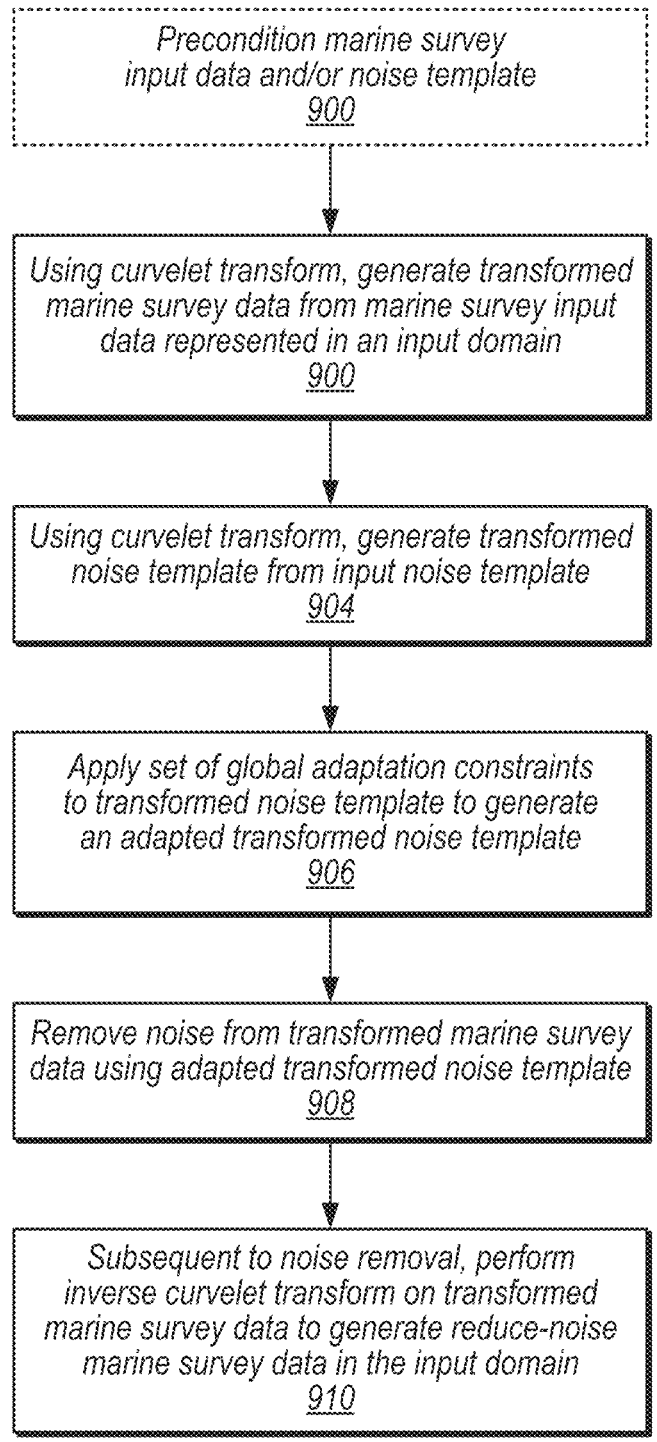
FIG. 9 shows a flow diagram that illustrates a variation of the noise removal process of FIG. 5.

FIG. 9 is an operational flow diagram that illustrates a variation of the noise removal process illustrated in FIG. 5 and is organized primarily in terms of operations rather than data flow. Operation begins in block 900 where, in an optional preconditioning operation, either the marine survey input data or the noise template, or both, are preconditioned prior to further processing. As discussed above, preconditioning may optionally be employed to remove certain types of errors prior to transform-domain processing.

Using a curvelet transform, transformed marine survey data is generated from marine survey input data represented in an input domain (block 902). As noted previously, the marine survey input data may include geophysical data indicative of geological structure, and may contain noise.

Using the curvelet transform, a transformed noise template is generated from an input noise template (block 904). As noted previously, the input noise template may be indicative of predicted noise in the marine survey input data.

A set of global adaptation constraints is then applied to the transformed noise template to generate an adapted transformed noise template (block 906). As noted above, the set of global adaptation constraints may be generated by performing statistical parameter estimation on the transformed marine survey data and the transformed noise template. In some embodiments, as noted above, performing statistical parameter estimation may include generating a mean amplitude ratio and mean phase difference for each of a number of subbands of the curvelet transform. For example, a subset of coefficients of the transformed noise template may be selected dependent upon an amplitude criterion. A respective histogram may be generated for each subband, where the histogram reflects amplitude ratios of members of the subset of coefficients of the transformed noise template and corresponding coefficients of the transformed survey data, where the mean amplitude ratio and mean phase difference statistics for a subband are generated dependent upon a most populous bin of the respective histogram for that subband.

Noise is removed from the transformed marine survey data using the adapted transformed noise template (block 908). For example, as discussed above, a process of adaptive subtraction may be used to combine the adapted transformed noise template and the transformed marine survey data.

Subsequent to noise removal, an inverse curvelet transform is performed on the transformed marine survey data to generate reduced-noise marine survey data in the input domain (block 910). For example, the inverse curvelet transform may transform de-noised marine survey data back to the original t-x domain.

In some embodiments, as described above, the statistical parameter estimation may also include generating a set of local adaptation constraints that, for each subband, include a standard deviation of amplitude ratio and a standard deviation of phase difference. Prior to removing noise from the transformed marine survey data, the local adaptation constraints may be applied to the adapted transformed noise template. For example, for a given subband of the adapted transformed noise template, a phase of a coefficient may be rotated dependent upon the standard deviation of phase difference generated for the given subband, and an amplitude of the coefficient may be scaled dependent upon the standard deviation of amplitude ratio generated for the given subband.

Example Computing System

Various operations described herein may be implemented by a computing device configured to execute program instructions that specify the operations. Similarly, various operations may be performed by circuitry designed or configured to perform the operations. In some embodiments, a non-transitory computer-readable medium has program instructions stored thereon that are capable of causing various operations described herein. As used herein, the term "processor," "processing unit," or "processing element" refers to various elements or combinations of elements configured to execute program instructions. Processing elements include, for example, circuits such as an ASIC (Application Specific Integrated Circuit), custom processing circuits or gate arrays, portions or circuits of individual processor cores, entire processor cores, individual processors, programmable hardware devices such as a field programmable gate array (FPGA) or the like, and/or larger portions of systems that include multiple processors, as well as any combinations thereof.

Figure 10:
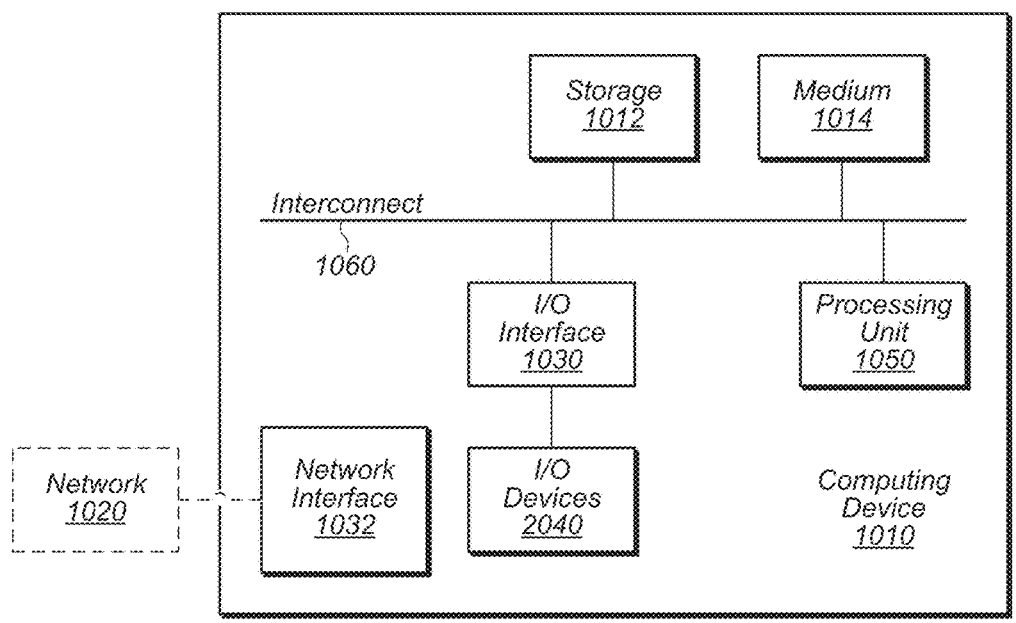
FIG. 10 shows a block diagram illustrating an example computing system.

Turning now to FIG. 10, a block diagram of a computing device (which may also be referred to as a computing system) 1010 is depicted, according to some embodiments. Computing device 1010 may be used to implement various portions of this disclosure. Computing device 1010 is one example of a device that may be used as a mobile device, a server computing system, a client computing system, or any other computing system implementing portions of this disclosure.

Computing device 1010 may be any suitable type of device, including, but not limited to, a personal computer system, desktop computer, laptop or notebook computer, mobile phone, mainframe computer system, web server, workstation, or network computer. As shown, computing device 1010 includes processing unit 1050, storage subsystem 1012, and input/output (I/O) interface 1030 coupled via interconnect 1060 (e.g., a system bus). I/O interface 1030 may be coupled to one or more I/O devices 1040. Computing device 1010 further includes network interface 1032, which may be coupled to network 1020 for communications with, for example, other computing devices.

As described above, processing unit 1050 includes one or more processors. In some embodiments, processing unit 1050 includes one or more coprocessor units. In some embodiments, multiple instances of processing unit 1050 may be coupled to interconnect 1060. Processing unit 1050 (or each processor within processing unit 1050) may contain a cache or other form of on-board memory. In some embodiments, processing unit 1050 may be implemented as a general-purpose processing unit, and in other embodiments it may be implemented as a special purpose processing unit (e.g., an ASIC). In general, computing device 1010 is not limited to any particular type of processing unit or processor subsystem.

Storage subsystem 1012 is usable by processing unit 1050 (e.g., to store instructions executable by and data used by processing unit 1050). Storage subsystem 1012 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 1012 may consist solely of volatile memory in some embodiments. Storage subsystem 1012 may store program instructions executable by computing device 1010 using processing unit 1050, including program instructions executable to cause computing device 1010 to implement the various techniques disclosed herein. In at least some embodiments, storage subsystem 1012 may represent an example of a non-transitory computer-readable medium that may store executable instructions.

In the illustrated embodiment, computing device 1010 further includes non-transitory medium 1014 as a possibly distinct element from storage subsystem 1012. For example, non-transitory medium 1014 may include persistent, tangible storage such as disk, nonvolatile memory, tape, optical media, holographic media, or other suitable types of storage. In some embodiments, non-transitory medium 1014 may be employed to store and transfer geophysical data, and may be physically separable from computing device 1010 to facilitate transport. Although shown to be distinct from storage subsystem 1012, in some embodiments, non-transitory medium 1014 may be integrated within storage subsystem 1012.

I/O interface 1030 may represent one or more interfaces and may be any of various types of interfaces configured to couple to and communicate with other devices, according to various embodiments. In some embodiments, I/O interface 1030 is a bridge chip from a front-side to one or more back-side buses. I/O interface 1030 may be coupled to one or more I/O devices 1040 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.). In some embodiments, the geophysical data product discussed above may be embodied within one or more of I/O devices 1040.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "apparatus configured to traverse a streamer" is intended to cover, for example, a mechanism that performs this function during operation, even if the mechanism in question is not currently being used (e.g., a power supply is not connected to it, or no streamer is currently present). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function, and may, after programming, be "configured to" perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f)

during prosecution, claim elements explicitly using the "means for [performing a function]" construct will be recited.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents (such as "one or more" or "at least one") unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Moreover, where flow charts are used to illustrate methods of operation, it is specifically contemplated that the illustrated operations and their ordering demonstrate only possible implementations. It is noted that alternative implementations that include more or fewer operations, or operations performed in a different order than shown, are possible and contemplated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Although various advantages of this disclosure have been described, any particular embodiment may incorporate some, all, or even none of such advantages.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims, and features from respective independent claims may be combined in any appropriate manner and not merely in the specific combinations enumerated in the appended claims.

What is claimed is:

1. A technological process comprising:
    performing, by one or more computers, operations comprising:
        transforming marine survey input data from an input domain using a complex-valued, directional, multi-resolution (CDM) transform to generate transformed marine survey data, wherein the marine survey input data includes geophysical data indicative of geological structure, and wherein the marine survey input data contains noise;
        transforming a noise template using the CDM transform to generate a transformed noise template, wherein the noise template is indicative of predicted noise in the marine survey input data;
        generating a set of global adaptation constraints dependent on the transformed marine survey data and the transformed noise template;
        generating an adapted transformed noise template dependent on the set of global adaptation constraints, wherein generating the adapted transformed noise template reduces one or more instances of global variation in the transformed noise template;
        subtracting the adapted transformed noise template from the transformed marine survey data to remove noise from the transformed marine survey data; and
        performing an inverse CDM transform on data resulting from the subtracting to generate reduced-noise marine survey data indicative of the geological structure in the input domain, thereby improving a signal-to-noise ratio of the reduced-noise marine survey data relative to the marine survey input data by reducing one or more instances of global variation in the transformed noise template.

2. The technological process of claim 1, wherein the CDM transform comprises a complex curvelet transform.

3. The technological process of claim 1, wherein generating the set of global adaptation constraints further comprises performing statistical parameter estimation with respect to at least one subband of the transformed marine survey data and at least one subband of the transformed noise template.

4. The technological process of claim 3, wherein performing statistical parameter estimation further comprises selecting, from the transformed noise template, a set of coefficients such that members of the set of coefficients each satisfy an amplitude threshold.

5. The technological process of claim 4, wherein the amplitude threshold is a user-configurable parameter.

6. The technological process of claim 3, wherein performing statistical parameter estimation further comprises constructing, for a given subband of the transformed marine survey data and a corresponding subband of the transformed noise template, a histogram including a plurality of bins of amplitude ratios; and
    wherein each amplitude ratio indicates a ratio of a member of a set of coefficients selected from the transformed noise template according to an amplitude threshold and a corresponding coefficient of the transformed marine survey data.

7. The technological process of claim 6, wherein constructing the histogram comprises determining a bin size of the plurality of bins dependent upon whether a most populous bin of the plurality of bins satisfies a population threshold.

8. The technological process of claim 6, wherein sizes of the plurality of bins are defined according to either an absolute scale or a logarithmic scale.

9. The technological process of claim 6, wherein performing statistical parameter estimation further comprises:
    selecting a most populous bin of the plurality of bins; and
    for coefficients included in the most populous bin, determining a mean amplitude ratio and a mean phase difference.

10. The technological process of claim 3, wherein generating the adapted transformed noise template comprises:
    generating a set of complex unary filters, wherein for each given subband of the transformed noise template, a corresponding member of the set of complex unary filters is generated dependent upon a mean amplitude ratio and a mean phase difference determined for the given subband; and
    applying the set of complex unary filters to the transformed noise template.

11. The technological process of claim 1, wherein the operations further comprise:
prior to performing the inverse CDM transform, generating a set of local adaptation constraints dependent on the transformed marine survey data and the transformed noise template;
wherein generating the adapted transformed noise template is further dependent on the set of local adaptation constraints and reduces one or more instances of local variation in the transformed noise template.

12. The technological process of claim 1, wherein the marine survey input data is marine survey seismic data.

13. The technological process of claim 1, wherein the reduced-noise marine survey data or geophysical data generated dependent on the reduced-noise marine survey data is stored within a tangible medium as a tangible geophysical data product.

14. A non-transitory machine-readable medium that stores instructions, wherein the instructions are executable by one or more processors to:
generate, using a curvelet transform, transformed marine survey data from marine survey input data represented in an input domain, wherein the marine survey input data includes geophysical data indicative of geological structure, and wherein the marine survey input data contains noise;
generate, using the curvelet transform, a transformed noise template from an input noise template, wherein the input noise template is indicative of predicted noise in the marine survey input data;
apply a set of global adaptation constraints to the transformed noise template to generate an adapted transformed noise template;
remove noise from the transformed marine survey data using the adapted transformed noise template; and
subsequent to noise removal, perform an inverse curvelet transform on the transformed marine survey data to generate reduced-noise marine survey data indicative of the geological structure in the input domain, thereby improving a signal-to-noise ratio of the reduced-noise marine survey data relative to the marine survey input data.

15. The non-transitory machine-readable medium of claim 14, wherein the instructions are further executable to perform statistical parameter estimation on the transformed marine survey data and the transformed noise template to generate the set of global adaptation constraints.

16. The non-transitory machine-readable medium of claim 15, wherein to perform statistical parameter estimation, the instructions are further executable to generate mean amplitude ratio and mean phase difference statistics for each of a plurality of subbands.

17. The non-transitory machine-readable medium of claim 16, wherein to generate mean amplitude ratio and mean phase difference statistics, the instructions are further executable to:
select a subset of coefficients of the transformed noise template dependent upon an amplitude criterion;
for each of the plurality of subbands, generate a respective histogram of amplitude ratios of members of the subset of coefficients of the transformed noise template relative to corresponding coefficients of the transformed marine survey data; and
for each of the plurality of subbands, generate the mean amplitude ratio and mean phase difference statistics dependent upon a most populous bin of the respective histogram.

18. The non-transitory machine-readable medium of claim 16, wherein to perform statistical parameter estimation, the instructions are further executable to generate a set of local adaptation constraints, the set of local adaptation constraints including a standard deviation of amplitude ratio and a standard deviation of phase difference for each of the plurality of subbands.

19. The non-transitory machine-readable medium of claim 18, wherein the instructions are further executable to:
prior to removing noise from the transformed marine survey data, apply the set of local adaptation constraints to the adapted transformed noise template.

20. The non-transitory machine-readable medium of claim 19, wherein to apply the set of local adaptation constraints, the instructions are further executable to:
for a given subband of the adapted transformed noise template, rotate a phase of a coefficient dependent upon the standard deviation of phase difference generated for the given subband; and
for the given subband of the adapted transformed noise template, scale an amplitude of the coefficient dependent upon the standard deviation of amplitude ratio generated for the given subband.

21. The non-transitory machine-readable medium of claim 14, wherein the instructions are further executable to:
precondition the marine survey input data prior to generating the transformed marine survey data; or
precondition the noise template prior to generating the transformed noise template.

22. A method of manufacturing a geophysical data product, comprising:
performing, by one or more computers, operations comprising:
preconditioning one or more of a noise template or marine survey input data;
subsequent to the preconditioning, performing a curvelet transform on the noise template to generate a transformed noise template, and performing the curvelet transform on the marine survey input data to generate transformed marine survey data;
performing statistical parameter estimation on the transformed noise template and the transformed marine survey data to yield a set of global adaptation constraints and a set of local adaptation constraints;
applying the set of global adaptation constraints to the transformed noise template to generate a globally adapted transformed noise template;
applying the set of local adaptation constraints to the globally adapted transformed noise template to generate a globally and locally adapted noise template;
combining the globally and locally adapted transformed noise template with the transformed marine survey data to yield resulting data;
performing an inverse curvelet transform on the resulting data to yield de-noised marine survey data; and
based on the de-noised marine survey data, storing geophysical data on a tangible computer-readable medium.

* * * * *